United States Patent [19]
Guay

[11] Patent Number: 5,557,712
[45] Date of Patent: Sep. 17, 1996

[54] COLOR MAP TABLES SMOOTHING IN A COLOR COMPUTER GRAPHICS SYSTEM AVOIDING OBJECTIONABLE COLOR SHIFTS

[75] Inventor: Randall G. Guay, Cupertino, Calif.

[73] Assignee: Apple Computer, Inc., Cupertino, Calif.

[21] Appl. No.: 197,055

[22] Filed: Feb. 16, 1994

[51] Int. Cl.$^6$ .................................................. H04N 1/46
[52] U.S. Cl. .................................. 395/130; 358/515
[58] Field of Search ...................... 395/130, 131

[56] References Cited

U.S. PATENT DOCUMENTS

| | | | |
|---|---|---|---|
| 4,670,780 | 6/1987 | McManus et al. | 358/518 |
| 4,941,038 | 7/1990 | Walowit | 358/518 |
| 5,243,414 | 9/1993 | Dalrymple et al. | 358/500 |
| 5,270,808 | 12/1993 | Tanioka | 358/527 |
| 5,299,291 | 3/1994 | Ruetz | 395/109 |
| 5,307,182 | 4/1994 | Maltz | 358/518 |
| 5,317,426 | 5/1994 | Hoshino | 358/515 |

FOREIGN PATENT DOCUMENTS

| | | |
|---|---|---|
| 0273398A2 | 7/1988 | European Pat. Off. . |
| 0410719A2 | 1/1991 | European Pat. Off. . |

OTHER PUBLICATIONS

"Colorimetric calibration in electronic imaging devices using a look-up-table model and interpolations", by Po-Chieh Hung in *Journal of Electronic Imaging*, Jan. 1993, vol. 2(1), pp. 53-61.

*Primary Examiner*—Heather R. Herndon
*Assistant Examiner*—Cliff N. Vo
*Attorney, Agent, or Firm*—Burns, Doane, Swecker & Mathis

[57] ABSTRACT

A method of smoothing a color lookup table minimizes inappropriate shifts away from gray, at the same time reducing the effect of measurement errors and enabling interpolation between the lookup table data points to be performed efficiently. More particularly, data in a preliminary lookup table, comprising a three-dimensional data array in which a location of each data point is designated by a unique tuple, is smoothed so as to satisfy predetermined constraints. A resulting three-dimensional lookup table relates source device colors and destination device colors in a computer graphics system in which a color image source device and a color image destination device have non-coincident color gamuts. The method is performed by, beginning at a data point representing white and concluding at a data point representing black, comparing a data point representing an adjacent shade of gray to neighboring data points and, if a color component of one or more of the neighboring data points differs in value from the same color component of the data point by more than a predetermined amount, adjusting the value of the color component of the one or more neighboring data points such that the color component of the one or more neighboring data points does not differ in value from the color component of the data point by more than the predetermined amount. Related data points whose tuples differ from a tuple of the data point in only one dimension are then compared to neighboring data points. The foregoing steps are repeated until the entire lookup table has been smoothed.

6 Claims, 1 Drawing Sheet

COLOR MAP TABLES SMOOTHING IN A COLOR COMPUTER GRAPHICS SYSTEM AVOIDING OBJECTIONABLE COLOR SHIFTS

BACKGROUND OF THE INVENTION

1. Field of the Invention

The present invention relates to color computer graphics and more particularly to smoothing of a color map table that maps from source device colors to destination device colors.

2. State of the Art

When converting colors from a source device, such as a CRT, to a destination device, such as a color printer, a popular method of determining the correct color for the destination device is by lookup table. A table is generated such that, when a color for the source device is indexed into the table, the correct color is output for the destination device.

If the destination table is determined by measurement, these measurements may contain errors, which could result in large, inappropriate color shifts from small shifts in input colors. Additionally, interpolators such as trilinear interpolators are used to perform mapping across the entire source color range using only a partial lookup table. In some interpolator implementations, the range of color change from one point to its neighbors may be limited. For example, the range of color change from one point to its neighbors might be limited to −32 to +31 counts out of the range 0 to 255. A requirement, then, is to smooth the table in three dimensions to allow for efficient interpolation, and to minimize measurement errors.

One approach to smoothing the table is to, starting at black (or white), scan each axis (red, green, or blue) one at a time in turn, until all points are verified to be within the constraints. However, due to measurement errors and gamut mapping, in the case of a number of colors, the components were found to increase too fast, resulting in shifts in the gray (achromatic) line. In the case of a color inkjet printer, for example, blue tends to climb rapidly from black to saturated. If the blue axis is traversed first, this causes values near the large values of blue be forced to also have a large value of blue, even if the adjacent colors should not have such a large value of blue. The effect is to shift from a gray color specification to one which has a blue chromatic component. This effect is still apparent if the red or green axis is traversed first. The values prove to be off by less than when the blue axis is traversed first, but a shift toward red or green is more apparent than one toward blue. This effect is highly undesirable, since people are very sensitive to inappropriate shifts away from gray.

What is needed, then, is a method of smoothing a color lookup table that eliminates or minimizes inappropriate shifts away from gray, at the same time reducing the effect of measurement errors and enabling interpolation between the lookup table data points to be performed efficiently.

SUMMARY OF THE INVENTION

The present invention provides a method of smoothing a color lookup table that achieves the foregoing objectives. More particularly, in accordance with one embodiment of the present invention, data in a preliminary lookup table, comprising a three-dimensional data array in which a location of each data point is designated by a unique tuple, is smoothed so as to satisfy predetermined constraints. A resulting three-dimensional lookup table relates source device colors and destination device colors in a computer graphics system in which a color image source device and a color image destination device have non-coincident color gamuts. The method is performed by, beginning at a data point representing white and concluding at a data point representing black, comparing a data point representing an adjacent shade of gray to neighboring data points and, if a color component of one or more of the neighboring data points differs in value from the same color component of the data point by more than a predetermined amount, adjusting the value of the color component of the one or more neighboring data points such that the color component of the one or more neighboring data points does not differ in value from the color component of the data point by more than the predetermined amount. Related data points whose tuples differ from a tuple of the data point in only one dimension are then compared to neighboring data points and, if a color component of one or more of the neighboring data points differs in value from the same color component of a respective related data point by more than a predetermined amount, the value of the color component of the one or more neighboring data points is adjusted such that the color component of the one or more neighboring data points does not differ in value from the color component of the respective related data point by more than the predetermined amount. The foregoing steps are repeated until the entire lookup table has been smoothed. This procedure has the effect of maintaining the grays, remaining within the interpolator constraints, and smoothing measurement errors.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

The present color mapping smoothing method may be used to smooth a color mapping lookup table constructed in accordance with copending U.S. application Ser. No. 08/197,059 entitled "SUBJECTIVELY PLEASING COLOR MAPPING IN A COLOR COMPUTER GRAPHICS SYSTEM", filed on even date herewith and commonly assigned, which is incorporated herein by reference. The lookup table may be, for example, a 17×17×17 three-dimensional data array. In accordance with a preferred embodiment of the invention of the foregoing application, the lookup table is indexed in accordance with a color specification in a device-independent color space (for example, a calibrated RGB color space) and producing a color specification of a mapped-to color in a representation equivalent to a destination device representation. For example, the lookup table entries may be in an RGB representation, which may be converted to a CMYK representation using a well-known set of equations. In the following description, therefore, the present color mapping smoothing method is described in terms of smoothing points in an RGB cube, assumed for sake of simplicity to be 4×4×4 in size. It should be understood, however, that the present method is generally applicable to color lookup tables of any size representing any color space.

Briefly, the present color mapping smoothing method solves the problem of shifts in color away from gray by, in effect, anchoring the color specification to the grays. Starting at white, repeatedly checks a diagonally adjacent point representing a next shade of gray, clipping out-of-bounds color component values, and then scans from the gray data point to the outer walls of the table. This procedure has the effect of maintaining the grays, remaining within the interpolator constraints, and smoothing measurement errors.

Figure 1:
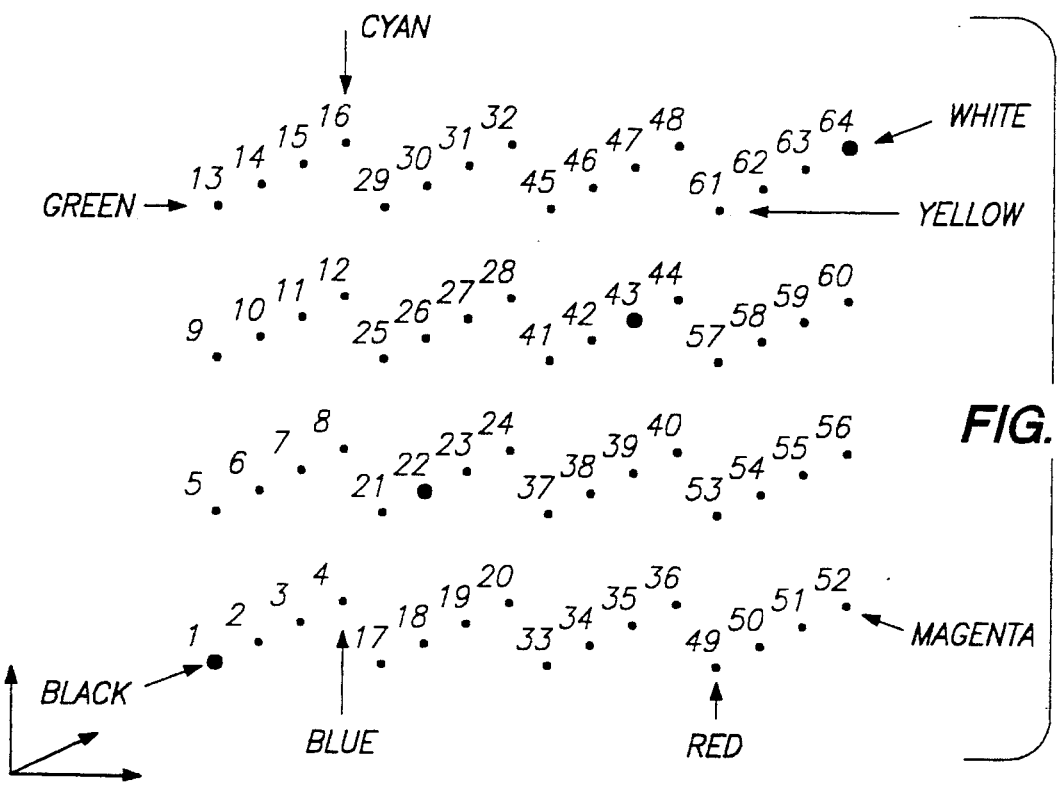
FIG. 1 is a schematic diagram of an RGB Cube representing a color mapping table, showing a scanning order that effects a shift from a gray color specification to one which has a chromatic component.

The foregoing procedure may be best understood by first contrasting it with the alternative procedure that produces disturbing color shifts. Referring to FIG. 1, a color lookup table having entries depicted as an array of dots represents a 4×4×4 RGB color space. The blue axis of the RGB color space extends in to page, the green axis extends upward, and the red axis extends to the right. Dots representing the grays (achromats) are drawn larger than dots having a chromatic component. A number associated with each dot indicates the order in which that point is tested for out-of-bounds conditions.

In the method depicted in FIG. 1, testing begins with black. Scanning from point to point proceeds in the direction of the blue axis. Each time a point is checked, each of its R, G and B color components are compared to the corresponding color components of all adjacent points. For points not on the outer wall of the RGB space, there are 26 adjacent points. Any adjacent point having a color component that is out-of-bounds with respect to the point being checked has that color component clipped.

Scanning from row to row proceeds in the direction of the green axis. Hence, after blue has been the fourth point checked, the next point checked (5) is the point directly above black in the red-green plane. Once cyan has been reached and checked, the entire blue-green plane will have been checked. Scanning from plane to plane proceeds in the direction of the red axis. The next point checked (17) is the point directly to the right of black in the red-green plane. Checking proceeds in this manner, advancing from point to point, until white has been checked as the last (64th) point. Such a method of color table smoothing is straightforward but produces undesirable color shifts away from gray as previously described.

Figure 2:
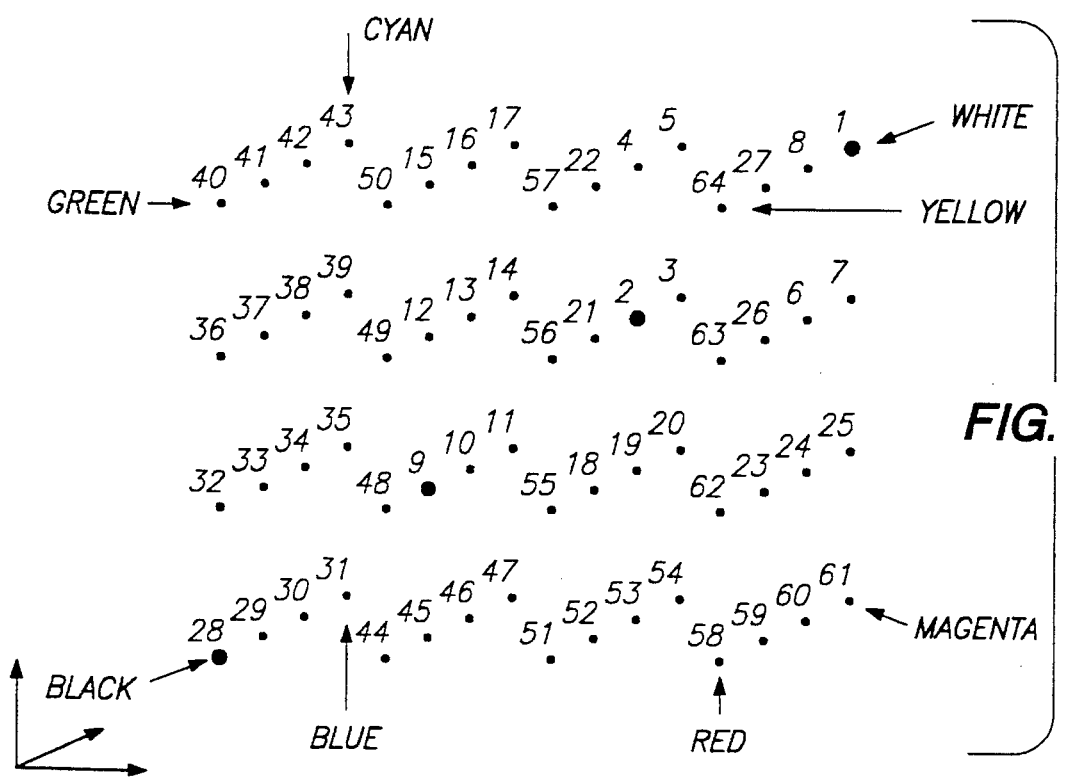
FIG. 2 is a schematic diagram of an RGB Cube representing a color mapping table, showing a scanning order that maintaints a gray color specification.

The foregoing method may now be contrasted with the present method of color mapping table smoothing. Referring to FIG. 2, scanning begins at white and proceeds from gray to gray. In effect, after white has been checked, the blue-green, red-blue and red-green outer walls of all cubic color subspaces that include white are scanned in order of smallest to largest subspace. Scanning is illustrated in FIG. 2 as proceeding point to point in the direction of the blue axis, row to row in the direction of the green axis, and plane to plane in the direction of the red axis, as in FIG. 1. Points previously scanned in conjunction with another subspace are not rescanned, however. Other scanning order may also be used so long as the first point scanned in each subspace is an achromat.

The smallest cubic subspace including white (point 1) is the 1×1×1 sub-space defined by points 1 through 8. The blue-green wall of this subspace includes points 2 through 5, which are scanned in that order. The red-blue wall includes points 2 and 3, already scanned, and points 6 and 7. The latter points are therefore scanned next. The red-green wall includes points 2 and 4, already scanned, point 6, already scanned, and point 8. Point 8 is therefore scanned to complete scanning of the subspace walls.

The largest subspace including white is the entire RGB cube. The blue-green outer wall of the cube is therefore scanned point to point (in the direction of the blue axis) and row to row (in the direction of the green axis). Shifting plane to plane in the direction of the red axis, scanning of the red-blue and red-green planes commences by scanning the row consisting of points 44 through 47. In the row consisting of points 48, 9, 10, and 11, all but point 48 will have already been scanned. Similarly, in the next two rows (in the green direction), only points 49 and 50, respectively, will remain to be scanned. Points 48, 49 and 50 are therefore scanned in this order. Again shifting plane to plane in the direction of the red axis, the row consisting of points 51 through 54 is scanned, after which points 55, 56 and 57 on the red-green wall are scanned. Finally, the row consisting of points 58 through 61 are scanned, followed by points 62, 63 and 64 on the red-green wall.

Subspaces of intermediated size between the smallest and largest, the scanning of which has been described, is performed in a similar manner.

By beginning the scanning of each subspace at an achromat, the color specification is anchored to the gray, avoiding disturbing color shifts encountered in other methods. In this manner the color lookup table may be smoothed so as to reduce the effect of measurement errors and to satisfy interpolator constraints while maintaining gray shades unchanged.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer-implemented method of smoothing data in a preliminary look-up table comprising a three-dimensional data array in which a location of each data point is designated by a unique set of coordinates, a resulting three-dimensional look-up table relating source device colors and destination device colors in a computer graphics system having a color image source device and a color image destination device having non-coincident color gamuts, the method comprising the steps of, beginning at a data point representing one of black and white and concluding at a data point representing the other of black and white:

a) comparing a data point representing a next closest shade of gray to neighboring data points;

b) if a color component of one or more of the neighboring data points differs in value from the same color component of the data point by more than a predetermined amount, adjusting the value of the color component of the one or more neighboring data points such that the color component of the one or more neighboring data points does not differ in value from the color component of the data point by more than the predetermined amount;

c) comparing related data points, having at least one coordinate the same as a coordinate of the data point, to neighboring data points;

d) if a color component of one or more of the neighboring data points differs in value from the same color component of a respective related data point by more than a predetermined amount, adjusting the value of the color component of the one or more neighboring data points such that the color component of the one or more neighboring data points does not differ in value from the color component of the respective related data point by more than the predetermined amount; and e) repeating steps a) through d).

2. The method of claim 1, comprising beginning at a data point representing white.

3. The method of claim 2, wherein step c) comprises:

c-1) comparing related data points whose first coordinate is the same as a first coordinate of the data point, to neighboring data points;

c-2) comparing related data points whose second coordinate is the same as a second coordinate of the data point, and not previously compared in step d), to neighboring data points; and c-3) comparing related data points whose third coordinate is the same as a third coordinate of the data point, and not previously compared in step d) or step e), to neighboring data points.

4. An apparatus for smoothing data in a preliminary look-up table comprising a three-dimensional data array in which a location of each data point is designated by a unique set of coordinates, a resulting three-dimensional look-up table relating source device colors and destination device colors in a computer graphics system having a color image source device and a color image destination device having non-coincident color gamuts, comprising:

a) means for, beginning at a data point representing one of black and white and concluding at a data point representing the other of black and white, comparing a data point representing a next closest shade of gray to neighboring data points;

b) means for, if a color component of one or more of the neighboring data points differs in value from the same color component of the data point by more than a predetermined amount, adjusting the value of the color component of the one or more neighboring data points such that the color component of the one or more neighboring data points does not differ in value from the color component of the data point by more than the predetermined amount;

c) means for comparing related data points, having at least one coordinate the same as a coordinate of the data point, to neighboring data points; and d) means for, if a color component of one or more of the neighboring data points differs in value from the same color component of a respective related data point by more than a predetermined amount, adjusting the value of the color component of the one or more neighboring data points such that the color component of the one or more neighboring data points does not differ in value from the color component of the respective related data point by more than the predetermined amount.

5. The apparatus of claim 4, wherein means a) begins at a data point representing white.

6. The apparatus of claim 5, wherein means c) comprises:

c-1) means for comparing related data points whose first coordinate is the same as a first coordinate of the data point, to neighboring data points;

c-2) means for comparing related data points whose second coordinate is the same as a second coordinate of the data point, and not previously compared in step d), to neighboring data points; and c-3) means for comparing related data points whose third coordinate is the same as a third coordinate of the data point, and not previously compared in step d) or step e), to neighboring data points.

\* \* \* \* \*

UNITED STATES PATENT AND TRADEMARK OFFICE
CERTIFICATE OF CORRECTION

PATENT NO. : 5,557,712
DATED : September 17, 1996
INVENTOR(S) : Randall G. GUAY

It is certified that error appears in the above-indentified patent and that said Letters Patent is hereby corrected as shown below:

Title page, item [54] and col. 1, line 1,
In the title, after "MAP", delete "TABLES" and insert --TABLE--.

Signed and Sealed this

Fourteenth Day of January, 1997

Attest:

BRUCE LEHMAN

*Attesting Officer*     *Commissioner of Patents and Trademarks*